(12) United States Patent
Khed et al.

(10) Patent No.: US 11,696,101 B2
(45) Date of Patent: Jul. 4, 2023

(54) WIRELESS TRANSCEIVER INDEXING

(71) Applicant: Continental Automotive Systems, Inc., Auburn Hills, MI (US)

(72) Inventors: Sudhir Khed, Troy, MI (US); Djordje Preradovic, Oakland, MI (US); Akshay Choudhari, Plano, TX (US); Aaron Adler, Rochester Hills, MI (US); Julio Kota, Tlajomulco de Zuniga (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 17/545,847

(22) Filed: Dec. 8, 2021

(65) Prior Publication Data

US 2023/0179972 A1  Jun. 8, 2023

(51) Int. Cl.
*H04W 4/48* (2018.01)
*H04W 8/00* (2009.01)

(52) U.S. Cl.
CPC .............. *H04W 4/48* (2018.02); *H04W 8/005* (2013.01)

(58) Field of Classification Search
None
See application file for complete search history.

(56) References Cited

U.S. PATENT DOCUMENTS

| | | | |
|---|---|---|---|
| 10,093,138 B2 | 10/2018 | DeCia et al. | |
| 2012/0314649 A1* | 12/2012 | Forenza | H04B 7/0465 370/328 |
| 2015/0195725 A1* | 7/2015 | Janbu | G01S 11/02 455/67.16 |
| 2020/0216025 A1 | 7/2020 | Le Bourgeois et al. | |
| 2021/0233197 A1* | 7/2021 | John | G01S 13/0209 |

OTHER PUBLICATIONS

International Search Report and Written Opinion dated Mar. 16, 2023 from corresponding International patent application No. PCT/US2022/052117.

* cited by examiner

*Primary Examiner* — Frantz Bataille

(57) ABSTRACT

An exemplary method for indexing transceivers uses wireless ranging functionality. The method includes determining a ranging distance between at least one transceiver and each other transceiver in a plurality of transceivers, determining a transceiver spatial distribution based on the ranging distance between at least one transceiver and each other transceiver in the plurality of transceivers, and indexing each transceiver by applying the transceiver spatial distribution to a spatial distribution map using an electronic control unit (ECU).

16 Claims, 3 Drawing Sheets

WIRELESS TRANSCEIVER INDEXING

TECHNICAL FIELD

The present disclosure relates generally to transceiver indexing, and more in one example to a method and system for wirelessly identifying transceiver locations within a vehicle.

BACKGROUND

Vehicles, such as passenger cars and light trucks include multiple parts mounted to the vehicle at various stages and throughout various original equipment manufacturers (OEMs). Many of these components include wireless transceivers that communicate with each other and with a central electronic control unit (ECU) of the vehicle. It is important for the vehicle controller to be able to uniquely identify the position of each transceiver in communication with the ECU in order to properly interpret the signals being received from the ECU, and for the ECU to provide the proper control signals to the systems including the transceivers.

In some existing systems the transceivers are identified by including unique hardware encoding in each transceiver, with the hardware encoding identifying the location that the transceiver is mounted. Hardware encoding such as this results in additional costs and complexity as multiple variations of otherwise identical transceiver components needs to be created. Further, the hardware encoding is subject to human error during the assembly process which can result in inefficient or undesirable operations of the vehicle.

SUMMARY OF THE INVENTION

An exemplary method for indexing transceivers using wireless ranging functionality, includes determining a ranging distance between at least one transceiver and each other transceiver in a plurality of transceivers, determining a transceiver spatial distribution based on the ranging distance between at least one transceiver and each other transceiver in the plurality of transceivers, and indexing each transceiver by applying the transceiver spatial distribution to a spatial distribution map using an electronic control unit (ECU).

In another example of the above described method for indexing transceivers using wireless ranging functionality the spatial distribution is the ranging distance between the at least one transceiver and each other transceiver.

Another example of any of the above described methods for indexing transceivers using wireless ranging functionality further includes hard coding a controller area network identification (CAN-ID) in each transceiver of the plurality of transceivers based on the determined mounting location of each transceiver using the ECU.

In another example of any of the above described methods for indexing transceivers using wireless ranging functionality determining the ranging distance between the at least one transceiver and each other transceiver in the plurality of transceivers comprises: a) identifying a first transceiver as a temporary master transceiver and determining ranging distance from the first transceiver to each other transceiver, b) identifying a transceiver in the plurality of transceivers that has not previously been identified as the temporary master transceiver as a new temporary master transceiver and identifying a ranging distance between the new temporary master transceiver and each other transceiver in the plurality of transceivers that has not had a ranging distance to the new master transceiver determine, and c) repeating step b) until a ranging distance between each transceiver and each other transceiver is determined.

In another example of any of the above described methods for indexing transceivers using wireless ranging functionality the ranging distance includes at least one of an ultrawide band Time-of-Flight, Bluetooth low energy Time-of-flight, Bluetooth low energy phase based ranging, Bluetooth low energy radio signal strength indicator ranging, and angle of arrival.

In another example of any of the above described methods for indexing transceivers using wireless ranging functionality each transceiver in the set of transceivers is interchangeable with each other transceiver in the set of transceivers.

In another example of any of the above described methods for indexing transceivers using wireless ranging functionality each transceiver in the set of transceivers is identical to each other transceiver in the set of transceivers.

In another example of any of the above described methods for indexing transceivers using wireless ranging functionality indexing each transceiver by applying the transceiver spatial distribution to a spatial distribution map using an electronic control unit (ECU) includes overlaying the determined spatial distribution to a stored spatial distribution of transceiver mounting positions.

In another example of any of the above described methods for indexing transceivers using wireless ranging functionality the ECU stores a plurality of transceiver spatial distributions, with each transceiver spatial distribution corresponding to a distinct original equipment manufacturer (OEM) configuration.

In another example of any of the above described methods for indexing transceivers using wireless ranging functionality overlying the determined spatial distribution to the stored spatial distribution includes overlaying the determine spatial distribution to each stored spatial distribution in the plurality of stored transceiver spatial distributions and identifying a matching stored spatial distribution.

In another example of any of the above described methods for indexing transceivers using wireless ranging functionality indexing each transceiver comprises identifying a mounting location of each transceiver within a vehicle.

In another example of any of the above described methods for indexing transceivers using wireless ranging functionality determining the ranging distance between at least one transceiver and each other transceiver comprises determining the ranging distance between each transceiver and each other transceiver.

In one exemplary embodiment an electronic control unit (ECU) includes a processor, a memory, and at least one antenna. The controller being configured to cause each transceiver in a plurality of transceivers determining a ranging distance between each transceiver and each other transceiver in a plurality of transceivers, and configured to determining a transceiver spatial distribution based on the ranging distance between each transceiver and each other transceiver in the plurality of transceivers and identify a mounting location of each transceiver within a vehicle by applying the transceiver spatial distribution to a vehicle containing the ECU.

In another example of the above described electronic control unit (ECU) the controller is configured to determine the ranging distance between each transceiver and each other transceiver by identifying a first transceiver as a temporary master transceiver and causing the first transceiver to determining ranging distance from the first transceiver to each other transceiver, identifying a transceiver in the plurality of transceivers that has not previously been identified as the temporary master transceiver as a new temporary master transceiver and causing the new temporary master transceiver to determine a ranging distance between the new temporary master transceiver and each other transceiver in the plurality of transceivers that has not had a ranging distance to the new master transceiver determined.

In another example of any of the above described electronic control units (ECU) the ECU is configured to repeat identifying a transceiver in the plurality of transceivers that has not previously been identified as the temporary master transceiver as a new temporary master transceiver and causing the new temporary master transceiver to determine a ranging distance between the new temporary master transceiver and each other transceiver in the plurality of transceivers that has not had a ranging distance to the new master transceiver determined until a ranging distance between each transceiver and each other transceiver has been determined.

In another example of any of the above described electronic control units (ECU) applying the transceiver spatial distribution to the vehicle comprises overlaying the determined spatial distribution to a stored spatial distribution of transceiver mounting positions.

These and other features of the present invention can be best understood from the following specification and drawings, the following of which is a brief description.

DETAILED DESCRIPTION

Figure 1:
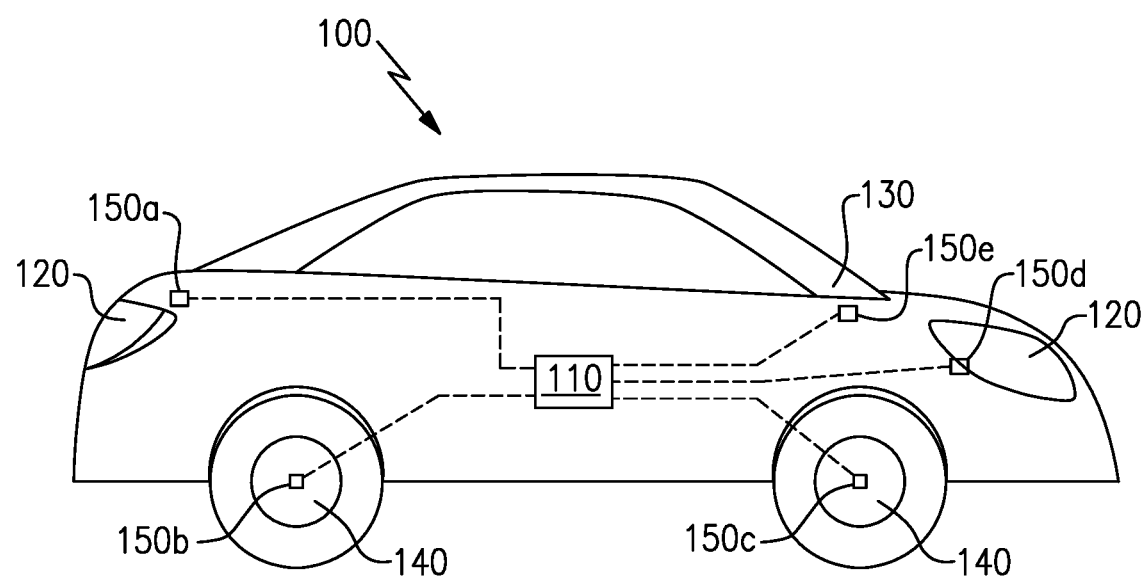
FIG. 1 illustrates an exemplary vehicle including multiple distinct vehicle systems, each including a transceiver.

FIG. 1 schematically illustrates an exemplary vehicle 100 including an electronic control unit (ECU) 110. The ECU 110 is in wireless communication with multiple distinct electronic systems throughout the vehicle 100, including a lighting system 120, a console system 130, and wheel systems 140. Each of the vehicle systems 120, 130, 140 includes one or more transceivers 150a, 150b, 150c, 150d, 150e. The transceivers 150a-e are in wireless communication with the ECU 110, and allow the ECU 110 to receive data from the corresponding vehicle systems 120, 130, 140, and provide control signals to controllers directly controlling the vehicle systems 120, 130, 140 through the transceivers 150a-e.

As each transceiver 150a-e is connected to a unique vehicle system 120, 130, 140, and in some cases a given vehicle system 120, 130, 140 may include multiple transceivers 150a-e connected at distinct locations and controlling distinct features, it is important for the ECU 110 to correctly identify which transceiver 150a-e is mounted in which location on the vehicle. The process of identifying which transceiver 150a-e is in which location is referred to as indexing the transceivers 150a-e.

Existing systems use a hardware pin encoding method where each transceiver uses two or more (depending on the number of transceivers) connector pins that are connected in unique configurations to provide a unique identifier to each transceiver within the system. The ECU can then determine which transceiver is being communicated with based on the state of the connector pins. By way of example, a system distinguishing between four transceivers could use two additional connector pins on each transceiver, with the pins being arranged in the following four unique configurations: Pin A and Pin B connected to ground, Pin A connected to battery and Pin B connected to ground, Pin A connected to ground, and Pin B connected to battery, and Pin A and Pin B connected to ground. Each of these pin configurations is mapped to a specific mounting location within the system, and transceivers installed at a given location have the pin configuration corresponding to that location.

Use of this type of hardware encoding requires at least 2 additional pins per transceiver, depending on the number of unique transceivers needed throughout the system, increases the cost of the transceivers, increases the complexity of the transceivers and of the overall assembly, and requires additional wiring to connect the extra pins to the corresponding control units.

In order to avoid the additional complexity and cost, the ECU 110 in the vehicle 100 causes the transceivers 150a-e to use a wireless ranging process to identify the distances of the transceivers 150a-e relative to each other. The relative distances are then applied to a spatial distribution map stored within the ECU 110 and the unique location of each transceiver 150a-e is identified based on matching the relative distances between transceivers 1506a-e with the relative distances defined on the spatial distribution map. Once the actual location of a transceiver 150a-150e within the vehicle 100 is identified, the ECU 110 hardcodes a specific transceiver identifier (e.g., a CAN-ID) in the software/firmware of the transceiver 150a-e. In a typical example, the direct communication between the ECU 110 and each transceiver 150a-e is done through a physical (alternatively referred to as a wired) connection between the ECU 110 and each transceiver 150a-e. The wired connection can be a CAN bus connection or any other physical connection. Using the wireless ranging process allows substantial identical, or exactly identical, transceivers to be used throughout the vehicle 100 and to be configured in identical configurations while still allowing for the transceivers 150a-e to be individually indexed to their correct location by the ECU 110. This reduces the complexity and cost of the control systems in the vehicle 100.

Figure 2:
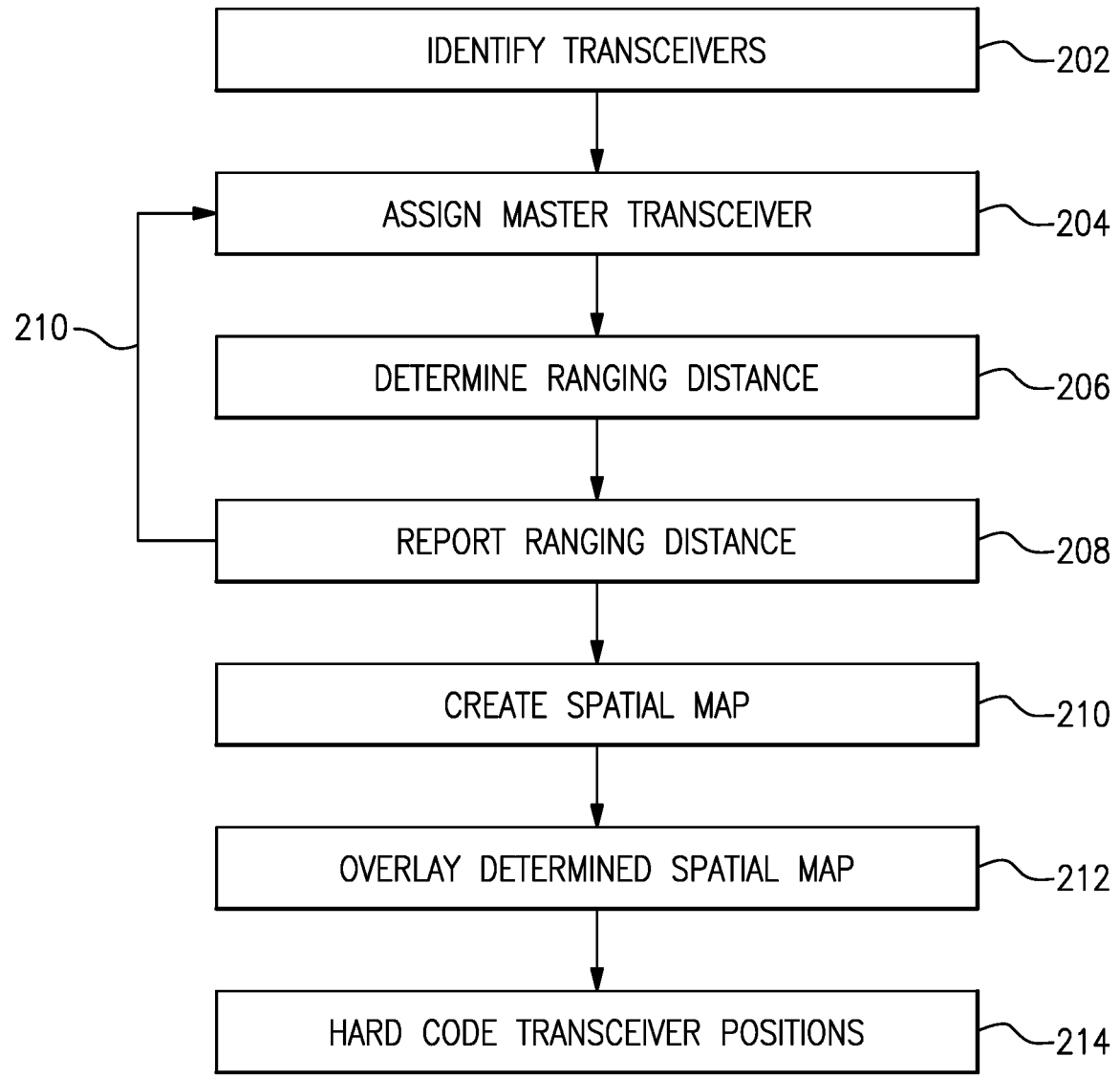
FIG. 2 illustrates a process for uniquely identifying each transceiver within a vehicle.

With continued reference to FIG. 1, FIG. 2 illustrates an indexing method 200 for identifying the unique mounting position of each transceiver 150a-e using a wireless ranging functionality built in to each transceiver 150a-e. Upon initial activation, the ECU 110 identifies all transceivers 150a-e in the system in an "Identify Transceivers" step 202 and assigns each transceiver a random temporary identification. The random temporary identification is used exclusively. Once all transceivers 150a-e have been identified, the ECU 110 assigns an arbitrary transceiver 150a-e to be a temporary master transceiver in an "Assign Master Transceiver" step 204.

The master transceiver 150a-e uses a wireless ranging protocol to determine a range between itself and each other transceiver 150a-e in a "Determine Ranging Distance" step 206. The ranging protocol is, in some examples, one or more of an ultrawide band time-of-flight, Bluetooth low energy time-of-flight, Bluetooth low energy phase based ranging, Bluetooth low energy radio signal strength indicator ranging, and angle of arrival ranging system. In alternative examples any other ranging protocol can be used to similar effect. The ranging distance is a straight line distance between the master transceiver 150*a-e* and the other transceiver 150*a-e* in the pair. Certain ranging protocols can also include a directionality to the ranging distance. The directionality can improve the performance of the method 200, although directionality is not necessary for indexing.

Once each ranging distance is determined, the ranging distance of each pair of transceivers 150*a-e* is reported to, and stored within, a memory of the ECU 110 in a "Report Ranging Distances" step 208. After the ranging distances are reported to the ECU 110, the ECU 110 repeats steps 204, 206 and 208 in a loop 210 by rescinding the master transceiver status from the initial master transceiver 150*a-e* and assigns a new transceiver 150*a-e* that has not previously been assigned the master transceiver status. As a ranging distance of a pair of transceivers 150*a-e* is independent of which transceiver 150*a-e* in the pair the ranging distance originated from, subsequent iterations of the loop 210 beyond the first in some examples omit ranging distances that have already been determined. By way of example, if transceiver 150*a* is assigned master status in the first iteration, a ranging distance from transceiver 150*a* to 150*b* is determined in the first iteration. In the subsequent iteration where transceiver 150*b* is assigned the master transceiver status, the ranging distance between 150*b* and 150*a* has already been determined and a new ranging distance can be omitted. This principle is illustrated and described below with regards to FIG. 3.

After all ranging distances have been determined and stored in the memory of the ECU 110, the ECU 110 determines a spatial distribution of each transceiver 150*a-e* relative to each other transceiver in a "Create Spatial Map" step 210. The spatial distribution is a database of the relative distances between each transceiver 150*a-e* and each other transceiver 150*a-e*. In cases where directionality is included within the wireless ranging protocol the spatial distribution also includes a directionality component between each transceiver 150*a-e* and each other transceiver 150*a-e*.

After creating the spatial distribution, the determined spatial distribution is compared to an expected spatial distribution map for the particular vehicle configuration in an "Overlay Determined Spatial Map" step 212. Overlaying the determined spatial distribution includes comparing the determined ranging distances between each transceiver 150*a-e* and each other transceiver 150*a-e* to the expected ranging distances and identifying the single unique match between detected transceivers 150*a-e* and expected transceivers such that all of the determined ranging distances match the corresponding stored ranging distances.

The matching identifies which transceiver 150*a-e* is at which position within the vehicle 110. In some examples, the match can be determined when less than all of the ranging distances have been determined (e.g., when the loop 210 has not performed sufficient iterations to determine every ranging distance but has determined sufficient ranging distances to uniquely match the spatial distribution map). In such examples, the loop 210 can be ended once enough ranging distances have been determined to form a single unique match. In some examples, the indexing can be limited to a system level, and each transceiver is identified as corresponding to a given system (e.g. lights, HVAC, steering, etc.) using the process described herein. In other examples, multiple transceivers within a single system can be indexed and differentiated from each other. By way of example, each wheel in a steering system, or each light in a lighting system, may have its own independent transceiver and the transceivers can be independently indexed.

After correlating each detected transceiver 150*a-e* with an expected mounting location in step 212, the ECU 110 transmits a signal to each detected transceiver 150*a-e* that hardcodes a transceiver identifier corresponding to the specific mounting location in a "Hardcode Transceiver Positions" step 214. The hardcoding can be via a software or firmware update to the transceiver 150*a-e* and does not alter the physical configuration or connections of the transceiver 150*a-e*. In one example the hardcoded identifier is a CAN-ID that identifies the specific mounting location and function of each transceiver 150*a-e*.

Figure 3:
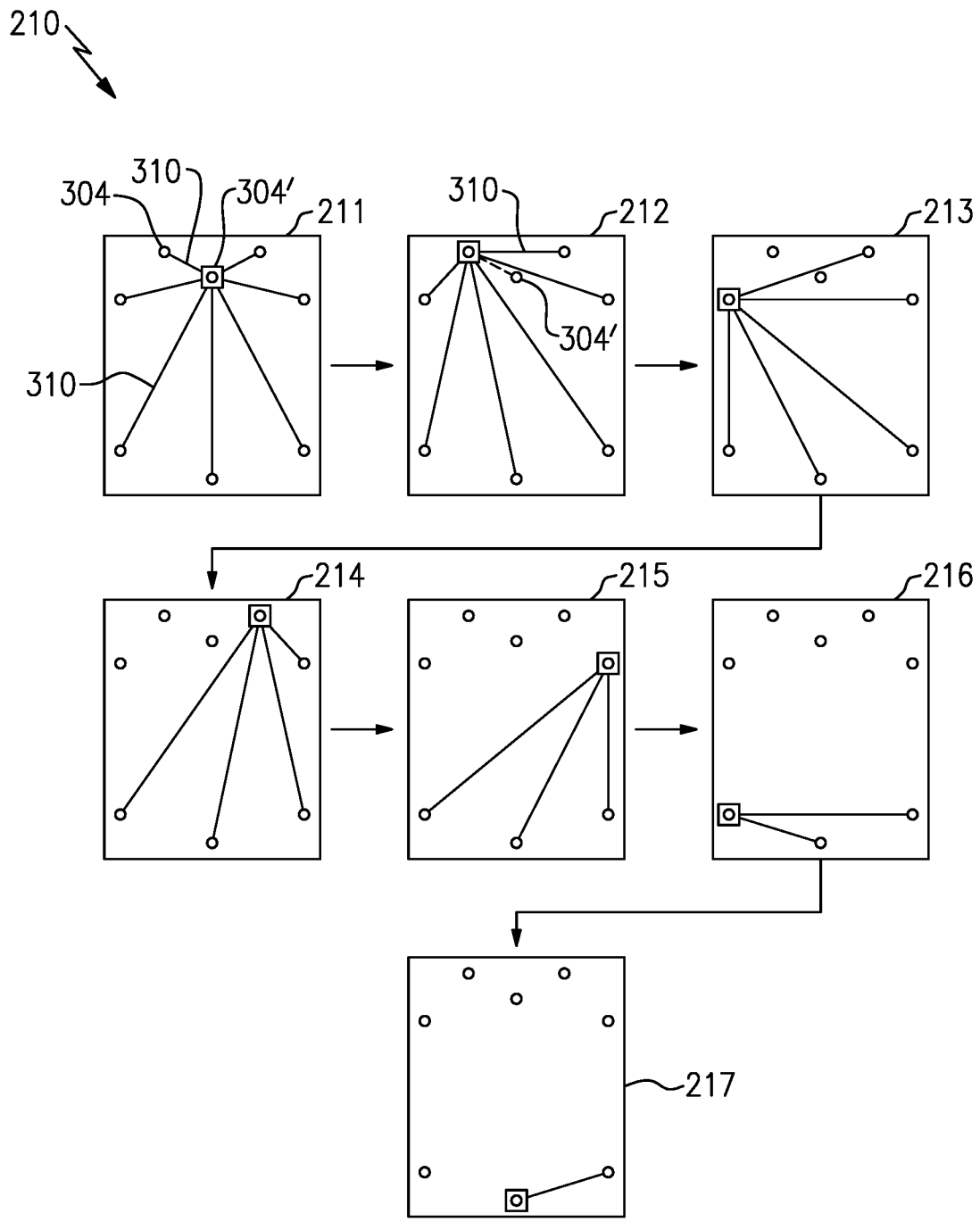
FIG. 3 schematically illustrates a wireless ranging sequence for identifying a range between each transceiver and each other transceiver in a vehicle.

With continued reference to FIGS. 1 and 2, FIG. 3 illustrates the iterations 211-217 of the loop 210 of FIG. 2 applied to a system 302 having eight transceivers 304. In the first iteration 211, an arbitrary transceiver 304' is identified as the master and employs a wireless ranging technique to identify a ranging distance 310 between itself and all seven other transceivers 304. The detected ranging distances are provided to the ECU, and the iteration 211 completes.

In the second iteration 212, a second arbitrary transceiver 304' is selected by the ECU 110 as the new master and employs the same wireless ranging function as the previous iteration 211. Ranging detections 310 are made to each other transceiver 304 with the exception of the transceiver 304' that established a range in the previous iteration 211.

The iterations 213, 214, 215, 216, and 217 continue in this fashion resulting in an eight transceiver configuration, such as that illustrated in FIG. 3, requiring seven iterations 211-217 of the loop 210 to determine a complete set of ranging distances 310.

As described above, in some examples, less than all ranges are necessary to identify the single unique matching set of mounting locations. In such an example, the later iterations 216, 217 may be omitted and the loop 210 is terminated early. In cases where the match can be determined early, the ECU 110 includes information regarding how many loops are required before the determined ranging distances can be applied to the spatial distribution map to achieve an accurate result, and stops the loop at the predefined number of iterations.

In another example, the vehicle 100 may have more than one possible configuration, and the ECU 110 includes multiple spatial distribution maps, with each map corresponding to a distinct distribution. In such examples, each spatial distribution map corresponds to one of the possible configurations and determining the matching spatial distribution map also determines which configuration the vehicle 100 is in.

In yet a further example, the configuration for the vehicle may include optional transceivers. In such an example, a single spatial distribution map can be utilized with the single spatial distribution map including transceivers flagged as "optional". When initially identifying the transceivers, the ECU 110 identifies the number of transceivers. If the number of transceivers is less than the maximum number, the ECU 110 assumes the optional transceivers have been omitted and does not consider the optional transceivers when comparing the determined ranging distances to the spatial distribution map.

It is appreciated that while the transceiver identification process is described herein within the context of automobile manufacturing, the process of wireless ranging to identify relative transceiver positioning is not limited to the automotive field. By way of example, the process described above could be used to supplement indoor GPS, object and/or inventory tracing within a warehouse, customer tracking within a supermarket and/or any similar system.

Furthermore, while the process of indexing transceivers is described herein as being preformed locally on a single controller, it is further appreciated that alternative implementations can include some or all of the process being performed via remote computing services, such as cloud computing, and function in fundamentally the same manner.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for indexing transceivers using wireless ranging functionality, comprising:
    determining a ranging distance between at least one transceiver and each other transceiver in a plurality of transceivers;
    determining a transceiver spatial distribution based on the ranging distance between at least one transceiver and each other transceiver in the plurality of transceivers; and
    indexing each transceiver by applying the transceiver spatial distribution to a spatial distribution map using an electronic control unit (ECU), wherein indexing each transceiver comprises identifying a distinct location of each transceiver.

2. The method of claim 1, wherein the spatial distribution is the ranging distance between the at least one transceiver and each other transceiver.

3. The method of claim 1, further comprising hard coding a controller area network identification (CAN-ID) in each transceiver of the plurality of transceivers based on the determined mounting location of each transceiver using the ECU.

4. The method of claim 1, wherein determining the ranging distance between the at least one transceiver and each other transceiver in the plurality of transceivers comprises:
    a) identifying a first transceiver as a temporary master transceiver and determining ranging distance from the first transceiver to each other transceiver;
    b) identifying a transceiver in the plurality of transceivers that has not previously been identified as the temporary master transceiver as a new temporary master transceiver and identifying a ranging distance between the new temporary master transceiver and each other transceiver in the plurality of transceivers that has not had a ranging distance to the new master transceiver determine; and
    c) repeating step b) until a ranging distance between each transceiver and each other transceiver is determined.

5. The method of claim 1, wherein the ranging distance includes at least one of an ultrawide band Time-of-Flight, Bluetooth low energy Time-of-flight, Bluetooth low energy phase based ranging, Bluetooth low energy radio signal strength indicator ranging, and angle of arrival.

6. The method of claim 1, wherein each transceiver in the set of transceivers is interchangeable with each other transceiver in the set of transceivers.

7. The method of claim 6, wherein each transceiver in the set of transceivers is identical to each other transceiver in the set of transceivers.

8. The method of claim 1, wherein indexing each transceiver by applying the transceiver spatial distribution to a spatial distribution map using an electronic control unit (ECU) includes overlaying the determined spatial distribution to a stored spatial distribution of transceiver mounting positions.

9. The method of claim 8, wherein the ECU stores a plurality of transceiver spatial distributions, with each transceiver spatial distribution corresponding to a distinct original equipment manufacturer (OEM) configuration.

10. The method of claim 9, wherein overlying the determined spatial distribution to the stored spatial distribution includes overlaying the determine spatial distribution to each stored spatial distribution in the plurality of stored transceiver spatial distributions and identifying a matching stored spatial distribution.

11. The method of claim 1, wherein indexing each transceiver comprises identifying a mounting location of each transceiver within a vehicle.

12. The method of claim 1, wherein determining the ranging distance between at least one transceiver and each other transceiver comprises determining the ranging distance between each transceiver and each other transceiver.

13. An electronic control unit (ECU) comprising:
    a processor, a memory, and at least one antenna;
    the controller being configured to cause each transceiver in a plurality of transceivers determining a ranging distance between each transceiver and each other transceiver in a plurality of transceivers, and configured to determining a transceiver spatial distribution based on the ranging distance between each transceiver and each other transceiver in the plurality of transceivers and index each transceiver by identifying a distinct mounting location of each transceiver within a vehicle by applying the transceiver spatial distribution to a spatial distribution map of a vehicle containing the ECU.

14. The electronic control unit (ECU) of claim 13, wherein the controller is configured to determine the ranging distance between each transceiver and each other transceiver by identifying a first transceiver as a temporary master transceiver and causing the first transceiver to determining ranging distance from the first transceiver to each other transceiver, identifying a transceiver in the plurality of transceivers that has not previously been identified as the temporary master transceiver as a new temporary master transceiver and causing the new temporary master transceiver to determine a ranging distance between the new temporary master transceiver and each other transceiver in the plurality of transceivers that has not had a ranging distance to the new master transceiver determined.

15. The electronic control unit (ECU) of claim 14, wherein the ECU is configured to repeat identifying a transceiver in the plurality of transceivers that has not previously been identified as the temporary master transceiver as a new temporary master transceiver and causing the new temporary master transceiver to determine a ranging distance between the new temporary master transceiver and each other transceiver in the plurality of transceivers that has not had a ranging distance to the new master transceiver determined until a ranging distance between each transceiver and each other transceiver has been determined.

16. The electronic control unit of claim 14, wherein applying the transceiver spatial distribution to the vehicle comprises overlaying the determined spatial distribution to a stored spatial distribution of transceiver mounting positions.

* * * * *